(12) United States Patent
Corbalán Pelegrín et al.

(10) Patent No.: US 11,743,091 B2
(45) Date of Patent: Aug. 29, 2023

(54) MOBILE DEVICE FREQUENCY OFFSET DETERMINATION AND TDOA LOCALIZATION

(71) Applicant: NXP B.V., Eindhoven (NL)

(72) Inventors: Pablo Corbalán Pelegrín, Graz (AT);
Michael Schober, Graz (AT);
Srivathsa Masthi Parthasarathi, Bangalore (IN); Stefan Lemsitzer, Stainz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/661,072

(22) Filed: Apr. 28, 2022

(65) Prior Publication Data

US 2022/0385519 A1    Dec. 1, 2022

(30) Foreign Application Priority Data

May 28, 2021  (EP) .................................... 21176556

(51) Int. Cl.
*H04L 27/26* (2006.01)
*H04J 3/06* (2006.01)
(Continued)

(52) U.S. Cl.
CPC ........ *H04L 27/2657* (2013.01); *H04J 3/0638* (2013.01); *H04L 7/0037* (2013.01); *H04W 56/0035* (2013.01)

(58) Field of Classification Search
CPC .. H04L 7/0037; H04L 27/2657; H04J 3/0638; H04W 56/0035
See application file for complete search history.

(56) References Cited

U.S. PATENT DOCUMENTS

| | | | |
|---|---|---|---|
| 2011/0007650 A1* | 1/2011 | Nam | G01S 5/14 370/252 |
| 2017/0339516 A1 | 11/2017 | Edge et al. | |
| 2022/0386214 A1* | 12/2022 | Kim | H04W 40/12 |

FOREIGN PATENT DOCUMENTS

WO    2020211119 A1    10/2020

OTHER PUBLICATIONS

Corbalan, Pablo et al.; "Chorus: UWB Concurrent Transmissions for GPS-like Passive Localization of Countless Targets"; 2019 18th ACM/IEEE International Conference on Information Processing in Sensor Networks (IPSN); Jun. 10, 2019, Montreal, QC, Canada; DOI: 10.1145/3302506.3310395.

(Continued)

*Primary Examiner* — David B Lugo (57) ABSTRACT

A method of estimating a clock frequency offset in a mobile device relative to a clock frequency of a controller within a UWB network comprises (a) determining, for each of a plurality of anchors, an anchor clock frequency offset relative to the controller clock frequency, (b) broadcasting an anchor data packet from each anchor, the anchor data packet including the respective anchor clock frequency offset, (c) receiving at least one anchor data packet at the mobile device, (d) estimating a mobile device clock frequency offset relative to the anchor clock frequency of the anchor from which the at least one anchor data packet was received, and (e) estimating the clock frequency offset in the mobile device based on the estimated mobile device clock frequency offset and the anchor clock frequency offset included in the at least one received anchor data packet. Furthermore, a TDoA-based localization method and a TDoA-based localization system are described.

20 Claims, 3 Drawing Sheets

(51) Int. Cl.
H04L 7/00 (2006.01)
H04W 56/00 (2009.01)

(56) References Cited

OTHER PUBLICATIONS

Corbalan, Pablo et al.; "Ultra-wideband Concurrent Ranging"; ACM Transactions on Sensor Networks; vol. 16, Issue 4, Article 41; Jan. 2020; DOI:https://doi.org/10.1145/3409477.

Dotlic, Igor et al.; 'Ranging Methods Utilizing Carrier Frequency Offset Estimation'; 2018 15th Workshop on Positioning, Navigation and Communications (WPNC); Oct. 25-26, 2018, Bremen, Germany; DOI: 10.1109/WPNC.2018.8555809.

Großwindhager, Bernhard et al.; "SnapLoc: An Ultra-Fast UWB-Based Indoor Localization System for an Unlimited Number of Tags"; 2019 18th ACM/IEEE International Conference on Information Processing in Sensor Networks (IPSN); Apr. 15-18, 2019, Montreal, QC, Canada.

Ledergerber, Anton et al.; "A robot self-localization system using one-way ultra-wideband communication"; IEEE/RSJ International Conference on Intelligent Robots and Systems (IROS); Sep. 28, 2015-Oct. 2, 2015, Hamburg, Germany; DOI: 10.1109/IROS.2015.7353810.

* cited by examiner

MOBILE DEVICE FREQUENCY OFFSET DETERMINATION AND TDOA LOCALIZATION

CROSS-REFERENCE TO RELATED APPLICATIONS

This application claims priority under 35 U.S.C. § 119 to European Patent Application No. 21176556.5, filed on May 28, 2021, the contents of which are incorporated by reference herein.

TECHNICAL FIELD

The present disclosure relates to the field of electronic communications. More specifically, the present disclosure relates to a method of estimating a clock frequency offset in a mobile device relative to a clock frequency of a controller within a UWB network. Furthermore, the present disclosure relates to a TDoA-based method of localizing a mobile device within a UWB network, and to a TDoA-based localization system.

ART BACKGROUND

In a number of applications of UWB communications systems, it is beneficial or even necessary to determine a frequency offset of an internal device clock relative to a reference clock. This applies, e.g., to TDoA-based UWB localization systems where a number of anchors transmit a sequence of data packets using wireless signals. Mobile devices in the area listen for these signals and compute their positions based on the different time of arrival of the signals and known transmission time information. To improve performance, mobile devices must estimate their clock frequency offset with regard to the TDoA time reference (i.e., the controller anchor) and apply a compensation to the TDoA estimates. To this end, the controller may send two packets within each TDoA round. This enables mobile devices to compensate for their frequency offset, but it also increases radio activity. Furthermore, if one of the two data packets is lost, the mobile device cannot estimate its frequency offset. In this case, a systematic error is introduced and a decrease in TDoA localization performance results.

There may thus be a need for a simple and robust way of determining a clock frequency offset in a mobile device.

SUMMARY

This need may be met by the subject matter according to the independent claims. Advantageous embodiments of the present disclosure are set forth in the dependent claims.

According to a first aspect, there is provided a method of estimating a clock frequency offset in a mobile device relative to a clock frequency of a controller within a UWB (ultra-wideband) network, the UWB network comprising a plurality of anchors in communication with the controller and the mobile device, each anchor in the plurality of anchors having a respective anchor clock. The method comprises: determining, for each of the plurality of anchors, an anchor clock frequency offset relative to the controller clock frequency, broadcasting an anchor data packet from each anchor, the anchor data packet including the respective anchor clock frequency offset, receiving at least one anchor data packet at the mobile device, estimating a mobile device clock frequency offset relative to the anchor clock frequency of the anchor from which the at least one anchor data packet was received, and estimating the clock frequency offset in the mobile device based on the estimated mobile device clock frequency offset and the anchor clock frequency offset included in the at least one received anchor data packet.

This aspect is based on the idea that the frequency offset in the mobile device relative to the controller clock frequency is estimated by combining information on an anchor clock frequency offset relative to the controller clock frequency with information on a mobile device clock frequency offset relative to the anchor clock frequency. The anchor clock frequency offset (relative to the controller clock frequency) is determined by the anchor and included in the broadcast anchor data packets. When receiving an anchor data packet, the mobile device estimates its own clock frequency offset relative to the anchor and combines this information with the information in the received anchor data packet to estimate the frequency offset relative to the controller clock frequency. In this way, the dedicated pairs of controller messages mentioned in the introduction are not needed. Instead of such direct determination, the clock frequency offset in the mobile device relative to the controller clock frequency is determined indirectly from the anchor clock frequency offset relative to the controller clock frequency and the mobile device clock frequency offset relative to the corresponding anchor clock frequency.

The controller may be identical or essentially similar to the anchors or it may be a different kind of device that does not act as an anchor in terms of broadcasting. In either case, the controller coordinates the broadcasting to be performed by the anchors and the controller clock serves as a system clock or reference clock within the UWB network.

According to an embodiment, the step of estimating the mobile device clock frequency offset relative to the anchor clock frequency utilizes carrier frequency offset estimation based on carrier integration.

In other words, the mobile device compares its local carrier frequency with the carrier frequency of the received signal to estimate the carrier frequency offset (CFO) between the anchor sending the received signal (anchor data packet) and the mobile device. The estimated offset between the clock frequency of the mobile device and the clock frequency of the anchor is then estimated based on the determined carrier frequency offset.

According to a further embodiment, the step of estimating the clock frequency offset in the mobile device comprises calculating a sum of the estimated mobile device clock frequency offset and the anchor clock frequency offset included in the at least one received anchor data packet.

In other words, the estimate of the clock frequency offset in the mobile device relative to the controller clock frequency is calculated by adding the estimated mobile device clock frequency offset (relative to the anchor clock) and the anchor clock frequency offset (relative to the controller clock) included in the received anchor data packet. This sum represents a preliminary estimate of the clock frequency offset in the mobile device relative to the controller clock.

According to a further embodiment, the step of determining the anchor clock frequency offset relative to the controller clock frequency comprises: receiving a first controller data packet at the anchor, the first controller data packet comprising a first controller timestamp indicating the time of transmission at the controller, and recording the time of receipt of the first controller data packet at the anchor as a first anchor timestamp, receiving a second controller data packet at the anchor, the second controller data packet comprising a second controller timestamp indicating the time of transmission at the controller, and recording the time of receipt of the second controller data packet at the anchor as a second anchor timestamp, and determining the anchor clock frequency offset by calculating a difference between the second controller timestamp and the first controller timestamp and dividing the calculated difference with a difference between the second anchor timestamp and the first anchor timestamp.

In other words, the anchor clock frequency offset relative to the controller clock frequency is determined as the ratio between the difference between the controller timestamps and the difference between the anchor timestamps for two subsequent controller data packets.

According to a further embodiment, the method further comprises: receiving a plurality of anchor data packets at the mobile device, estimating, for each of the received anchor data packets, a mobile device clock frequency offset relative to the anchor clock frequency of the anchor from which the anchor data packet was received, and estimating the clock frequency offset in the mobile device relative to the clock frequency of the controller based on the estimated mobile device clock frequency offsets relative to the anchor clock frequencies and the anchor clock frequency offsets relative to the controller clock frequency included in the received anchor data packets.

In other words, the mobile device receives anchor data packets from a plurality of anchors, estimates the mobile device clock frequency offset relative to each of these anchors, and uses these estimates together with the anchor clock frequency offsets relative to the controller clock frequency included in the received anchor data packets to estimate the clock frequency offset in the mobile device relative to the controller clock frequency.

According to a further embodiment, the step of estimating the clock frequency offset in the mobile device comprises calculating, for each of the anchors from which the plurality of anchor data packets was received, a sum of the estimated mobile device clock frequency offset and the anchor clock frequency offset included in the anchor data packet received from the corresponding anchor.

In other words, a sum of the two estimates (estimated mobile device clock frequency offset relative to the anchor and estimated anchor clock frequency offset relative to the controller clock frequency) is calculated for each anchor. As noted above, each of these sums (i.e., one sum per anchor) provides at least a rough or preliminary estimate of the sought frequency offset.

According to a further embodiment, the step of estimating the clock frequency offset in the mobile device further comprises statistical processing of the calculated sums.

By applying statistical processing to the calculated sums, noise and outliers can be reduced or even removed such that an overall better estimate of the sought frequency offset can be obtained.

According to a further embodiment, the statistical processing comprises calculating an average value of the calculated sums.

Although averaging is preferable in many embodiments, other types of statistical processing, such as calculating a median value or a weighted average, may be used in other embodiments.

According to a second aspect, there is provided a TDoA (Time Difference of Arrival) based method of localizing a mobile device within a UWB network, the UWB network comprising a controller and a plurality of anchors in communication with the controller and the mobile device, each anchor in the plurality of anchors having a respective anchor clock and the controller having a controller clock. The method comprises: determining, for each of the plurality of anchors, an anchor clock frequency offset relative to the controller clock frequency, broadcasting an anchor data packet from each anchor, the anchor data packet including the respective anchor clock frequency offset and an anchor timestamp, receiving a plurality of anchor data packets at the mobile device, each anchor data packet originating from one of the plurality of anchors, recording, for each of the received anchor data packets, a corresponding timestamp of arrival, estimating, for each of the received anchor data packets, a mobile device clock frequency offset relative to the anchor clock frequency of the anchor from which the anchor data packet was received, estimating a clock frequency offset in the mobile device relative to the clock frequency of the controller based on the estimated mobile device clock frequency offsets relative to the anchor clock frequencies and the anchor clock frequency offsets included in the received anchor data packets, and determining a location of the mobile device based on the anchor timestamps in the received anchor data packets, the recorded timestamps of arrival for each of the received anchor data packets, and the estimated clock frequency offset in the mobile device.

This aspect provides a method of localizing a mobile device utilizing the, as such, known principle of TDoA (Time Difference of Arrival) while benefitting from the simple and robust method of the first aspect to determine a clock frequency offset in the mobile device relative to the controller clock frequency, which constitutes the common time reference for the localization. Thereby, very precise localization of the mobile device, e.g., within a building, such as an office building, a hospital, a shopping center, a parking garage, etc. can be obtained using e.g., known hyperbolic localization techniques.

The controller may be identical or essentially similar to the anchors or it may be a different kind of device that does not act as an anchor in terms of broadcasting. In either case, the controller coordinates the broadcasting to be performed by the anchors and the controller clock serves as a system clock or reference clock within the UWB network.

According to a further embodiment, the step of estimating the mobile device clock frequency offset relative to the anchor clock frequency utilizes carrier frequency offset estimation based on carrier integration.

In other words, the mobile device compares its local carrier frequency with the carrier frequency of the received signal to estimate the carrier frequency offset (CFO) between the anchor sending the received signal (anchor data packet) and the mobile device. The estimated offset between the clock frequency of the mobile device and the clock frequency of the anchor is then estimated based on the determined carrier frequency offset.

According to a further embodiment, the step of determining, for each of the plurality of anchors, the anchor clock frequency offset relative to the controller clock frequency comprises: receiving a first controller data packet at the anchor, the first controller data packet comprising a first controller timestamp indicating the time of transmission at the controller, and recording the time of receipt of the first controller data packet at the anchor as a first anchor timestamp, receiving a second controller data packet at the anchor, the second controller data packet comprising a second controller timestamp indicating the time of transmission at the controller, and recording the time of receipt of the second controller data packet at the anchor as a second anchor timestamp, and determining the anchor clock frequency offset by calculating a difference between the second controller timestamp and the first controller timestamp and dividing the calculated difference with a difference between the second anchor timestamp and the first anchor timestamp.

In other words, the anchor clock frequency offset relative to the controller clock frequency is determined as the ratio of the difference between the controller timestamps and the difference between the anchor timestamps for two subsequent controller data packets.

According to a further embodiment, the step of estimating the clock frequency offset in the mobile device comprises calculating, for each of the anchors from which the plurality of anchor data packets was received, a sum of the estimated mobile device clock frequency offset and the anchor clock frequency offset included in the anchor data packet received from the corresponding anchor.

In other words, a sum of the two estimates (estimated mobile device clock frequency offset relative to the anchor and estimated anchor clock frequency offset relative to the controller clock frequency) is calculated for each anchor. Each of these sums (i.e., one sum per anchor) provides at least a rough or preliminary estimate of the sought frequency offset.

According to a further embodiment, the step of estimating the clock frequency offset in the mobile device further comprises statistical processing of the calculated sums.

By applying statistical processing to the calculated sums, noise and outliers can be reduced or even removed such that an overall better estimate of the sought frequency offset can be obtained.

According to a further embodiment, the statistical processing comprises calculating an average value of the calculated sums.

Although averaging is preferable in many embodiments, other types of statistical processing, such as calculating a median value or a weighted average, may be used in other embodiments.

According to a third aspect, there is provided a TDoA-based localization system, the system comprising: at least one UWB enabled mobile device having a mobile device clock, and a UWB network, the UWB network comprising a controller and a plurality of anchors, each anchor in the plurality of anchors having a respective anchor clock and the controller having a controller clock. Each of the anchors is configured to determine an anchor clock frequency offset relative to the controller clock frequency, and broadcast an anchor data packet, the anchor data packet including the respective anchor clock frequency offset and an anchor timestamp. The at least one mobile device is configured to receive a plurality of anchor data packets, each anchor data packet originating from one of the plurality of anchors, record, for each of the received anchor data packets, a corresponding timestamp of arrival, estimate, for each of the received anchor data packets, a mobile device clock frequency offset relative to the anchor clock frequency of the anchor from which the anchor data packet was received, estimate a clock frequency offset in the mobile device relative to the clock frequency of the controller based on the estimated mobile device clock frequency offsets relative to the anchor clock frequencies and the anchor clock frequency offsets included in the received anchor data packets, and determine a location of the mobile device based on the anchor timestamps in the received anchor data packets, the recorded timestamps of arrival for each of the received anchor data packets, and the estimated clock frequency offset in the mobile device.

This aspect is essentially based on the same idea as the second aspect discussed above and thus provides a TDoA-based localization system capable of using the simple and robust method of the first aspect to determine a clock frequency offset in the mobile device relative to the controller clock frequency, which constitutes the common time reference for the localization. Thereby, very precise localization of the mobile device, e.g., within a building, such as an office building, a hospital, a shopping center, a parking garage, etc. can be obtained using, e.g., known hyperbolic localization techniques.

The controller may be identical or essentially similar to the anchors or it may be a different kind of device that does not act as an anchor in terms of broadcasting. In either case, the controller coordinates the broadcasting to be performed by the anchors and the controller clock serves as a system clock or reference clock within the UWB network.

According to a further embodiment, the at least one mobile device is configured to estimate the mobile device clock frequency offset relative to the anchor clock frequency by utilizing carrier frequency offset estimation based on carrier integration.

In other words, the mobile device is configured to compare its local carrier frequency with the carrier frequency of the received signal to estimate the carrier frequency offset (CFO) between the anchor sending the received signal (anchor data packet) and the mobile device. The mobile device then estimates the offset between the clock frequency of the mobile device and the clock frequency of the anchor based on the determined carrier frequency offset.

According to a further embodiment, each of the anchors is configured to determine the anchor clock frequency offset relative to the controller clock frequency by: receiving a first controller data packet at the anchor, the first controller data packet comprising a first controller timestamp indicating the time of transmission at the controller, and recording the time of receipt of the first controller data packet at the anchor as a first anchor timestamp, receiving a second controller data packet at the anchor, the second controller data packet comprising a second controller timestamp indicating the time of transmission at the controller, and recording the time of receipt of the second controller data packet at the anchor as a second anchor timestamp, and determining the anchor clock frequency offset by calculating a difference between the second controller timestamp and the first controller timestamp and dividing the calculated difference with a difference between the second anchor timestamp and the first anchor timestamp.

In other words, each anchor is configured to determine the anchor clock frequency offset relative to the controller clock frequency as the ratio of the difference between the controller timestamps and the difference between the anchor timestamps for two controller data packets subsequently received at the anchor.

According to a further embodiment, the at least one mobile device is configured to estimate the clock frequency offset in the mobile device by calculating, for each of the anchors from which the plurality of anchor data packets was received, a sum of the estimated mobile device clock frequency offset and the anchor clock frequency offset included in the anchor data packet received from the corresponding anchor.

In other words, the mobile device is configured to calculate a sum of the two estimates (estimated mobile device clock frequency offset relative to the anchor and estimated anchor clock frequency offset relative to the controller clock frequency) for each anchor. Each of these sums (i.e., one sum per anchor) provides at least a rough or preliminary estimate of the sought frequency offset.

According to a further embodiment, the at least one mobile device is further configured to estimate the clock frequency offset in the mobile device by performing statistical processing of the calculated sums, in particular by calculating an average value of the calculated sums.

By applying statistical processing to the calculated sums, noise and outliers can be reduced or even removed such that an overall better estimate of the sought frequency offset can be obtained. Although averaging is preferable in many embodiments, other types of statistical processing, such as calculating a median value or a weighted average, may be used in other embodiments.

It should be noted that exemplary embodiments have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present disclosure will be apparent from the examples of embodiment to be described hereinafter and are explained with reference to the examples of embodiment. Aspects of the present disclosure will be described in more detail hereinafter with reference to examples of embodiment to which the present disclosure is, however, not limited.

DETAILED DESCRIPTION

The illustration in the drawing is schematic. It is noted that in different figures, similar or identical elements are provided with the same reference signs or with reference signs, which differ only within the first digit.

Figure 1:
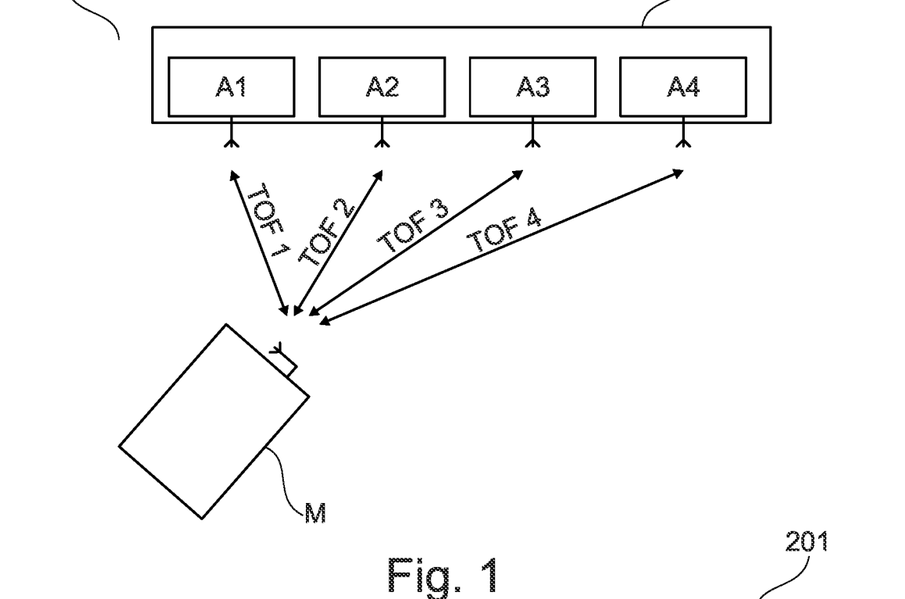
FIG. 1 shows a TDoA localization system according to an embodiment.

FIG. 1 shows a TDoA localization system 100 according to an embodiment. The system 100 comprises one or more mobile devices M and a UWB network 105. The UWB network comprises a plurality of anchors A1, A2, A3, A4. One of the anchors A1, A2, A3, A4 acts as a controller, i.e., it defines a reference clock (controller clock) for the system 100 and coordinates broadcasting of data packets from the other anchors in the UWB network 105, as will be described further below. In other embodiments, the controller may differ from the anchors in various ways. FIG. 1 shows four anchors A1, A2, A3, A4. However, it should be understood, that the UWB network 105 may comprise any number of anchors, including tens, hundreds or even thousands of anchors. Each anchor A1, A2, A3, A4 is fixed at a known location within the localization system 100 and may in some embodiments also be interconnected by a wired network in addition to being able to communicate wirelessly with each other via UWB communication. In the following description, the anchor A1 will generally be referred to as the controller. However, in other embodiments, any of the other anchors A2, A3, A4 may be configured as the controller. Similarly, the system 100 may comprise any number of mobile devices M, including tens, hundreds or even thousands of mobile devices M. As generally known in the art, the anchors A1, A2, A3, A4 broadcast data packets which allow the mobile device(s) M to determine the time differences between the arrivals of the respective data packets at the mobile device M. These time differences of arrival are caused by the different distances and thereby different times of flight TOF1-TOF4 to the anchors A1, A2, A3, A4. Based on the determined time differences and the known location of each anchor A1, A2, A3, A4, the mobile device M can then determine its position within the system 100 using so-called hyperbolic localization.

Figure 2:
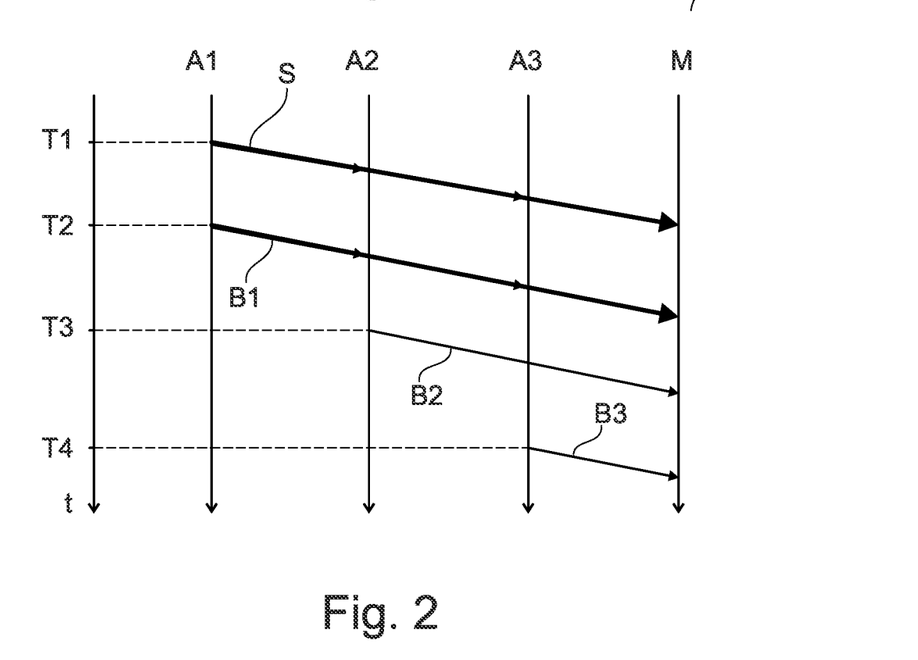
FIG. 2 shows a typical message sequence in a downlink TDoA localization system.

FIG. 2 shows a typical message sequence 201 in a downlink TDoA localization system, such as the system 100 shown in FIG. 1. It is noted that other message sequences are possible, as known in the art. The controller anchor A1 transmits a first controller data packet S at time t=T1. The first controller data packet S (synch) is then received somewhat later at anchor A2, then at anchor A3 and finally at the mobile device M. Then, at t=T2, the controller anchor A1 transmits a second controller data packet B1 (blink 1) which, like the first controller data packet S, is received by the anchor A2, then by the anchor A3, and finally by the mobile device M. Somewhat later, at t=T3, the anchor A2 transmits an anchor data packet B2 blink 2), which later on arrives at the anchor A3, then at the mobile device M. Finally, the anchor A3 transmits an anchor data packet B3 (blink 3) which is later received by the mobile device M. It is noted that the order in which the data packets are received has no impact on the procedure. The mobile device M measures the received (RX) timestamps of all data packets S, B1, B2, B3 and obtain the transmission (TX) timestamps in the common time base (CTB) of the controller A1. To this end, all anchor data packets include the TX timestamp in the transmitted packets. Alternatively, they can also include the time elapsed between the last controller packet and their transmissions (e.g., the time between the Blink from the controller and the Blink of each anchor or the time between the POLL of the controller and the RESP of each anchor).

To perform TDoA localization, the set of anchors A1-A4 must be time synchronized, e.g., in order to translate all timestamps to a common time domain, i.e., the common time base (CTB) of the controller A1. The anchors A1-A4 may be synchronized using a wired infrastructure (not shown) where the controller clock is directly distributed to all controlled anchors A2-A4 or using in-band wireless clock synchronization. In the latter case, the anchors must measure their clock offset and clock frequency offset with regard to the controller anchor A1. To measure the clock offset $\theta_{i,ref}$ between controlled anchor i (the controlled anchor may also be denoted controlee) and the controller ref, the controlled anchors A2-A4 must simply compare the TX and RX timestamp of a controller packet and account for the known time of flight (ToF) $\tau_{i,ref}$ between them as follows:

$$\theta_{i,ref} = r_i^{SYNCH} - t_{ref}^{SYNCH} - \tau_{i,ref}$$

where $r_i^{SYNCH}$ and $t_{ref}^{SYNCH}$ denote the RX and TX timestamp of the Synch packet at the controlled anchor and at the controller, respectively. Note that any other controller message can be used for this purpose.

In turn, to determine the frequency offset of anchors A2-A4 with regard to the controller A1, the anchors A2-A4 can compare the time elapsed as measured at the receiver and at the transmitter between two consecutive packets from the controller, e.g., the Synch-Blink pair S, B1 or two other data packets from consecutive TDoA exchanges. In the case of two consecutive Synch packets, we obtain:

$$K_{i,ref} = \frac{t_{ref}^{SYNCH,N} - t_{ref}^{SYNCH,N-1}}{r_i^{SYNCH,N} - r_i^{SYNCH,N-1}}$$

The estimated clock offset $\theta_{i,ref}$ and frequency offset $K_{i,ref}$ can be then used to translate TX timestamps to the common time base (CTB) of the controller or to compensate for the frequency offset of the anchors A2-A4 during their response delays. This information must be shared with mobile devices M so that they can perform TDoA localization.

To improve TDoA localization, the mobiles devices M must also estimate their frequency offset with regard to the controller anchor A1. The conventional approach to do this is based on two consecutive packets from the controller as shown in FIG. 1. In these cases, the mobile estimates its frequency offset $K_{M,ref}$ as follows:

$$K_{M,ref} = \frac{t_{ref}^{Blink} - t_{ref}^{SYNCH}}{r_M^{Blink} - r_M^{SYNCH}}$$

Afterwards, it can compensate for its frequency offset in each TDoA measurement $\Delta t_{i,ref}$ as follows:

$$\hat{\Delta t}_{i,ref} = K_{M,ref}(r_M^{Blink,i} - r_M^{Blink,ref}) - (t_i^{Blink,i} - t_{ref}^{Blink,ref})$$

Here, $r_{m,Blink,i}$, $r_M^{Blink,ref}$ denote the RX timestamps of the Blink data packet Bi from anchor i and the controller ref, while $t_i^{Blink,i}$, $t_{ref}^{Blink,ref}$ denote the TX timestamps in CTB of the same packets.

The main problem in existing approaches is that the mobile devices M need to receive the two transmitted packets S and B1 from the controller A1 to estimate their frequency offset, see FIG. 1. This implies longer packet exchanges, which lead to higher energy consumption, shorter battery lifetime, and lower scalability/update rates. More importantly, in the case that a mobile device M misses or does not receive one of the two packets, it cannot estimate its frequency offset and therefore, it cannot compensate for it in the TDoA equation above, thereby decreasing the attainable accuracy and precision of the proposed TDoA scheme.

These and other issues are addressed by the methods of determining clock frequency offset relative to the controller clock as presented herein.

Figure 3:
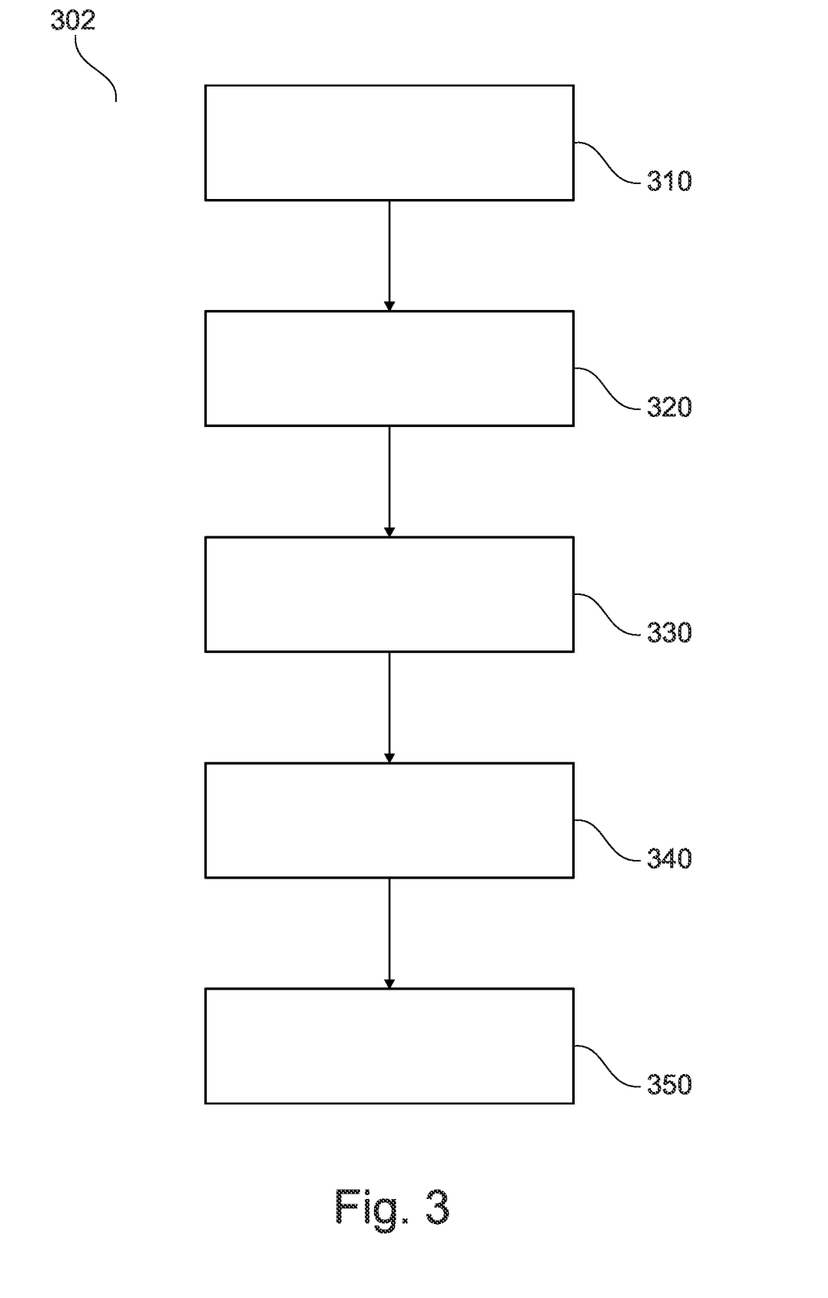
FIG. 3 shows a block diagram of a method of determining clock frequency offset in a mobile device in accordance with an embodiment.

FIG. 3 shows a block diagram 302 of a method of determining clock frequency offset in a mobile device M relative to the clock frequency of the controller A1 within UWB network 105 in accordance with an embodiment. As described above in conjunction with FIG. 1, the UWB network comprises a plurality of anchors A2-A4 in communication with the controller A1 and the mobile device M. Each anchor A2-A4 has a respective anchor clock. The method comprises a step 310 of determining, for each of the plurality of anchors A2-A4, an anchor clock frequency offset relative to the controller A1 clock frequency. The method 302 further comprises a step 320 of broadcasting an anchor data packet from each anchor A2-A4, the anchor data packet including the respective anchor clock frequency offset. The method further comprises a step 330 of receiving at least one anchor data packet at the mobile device M. The method further comprises a step 340 of estimating a mobile device clock frequency offset relative to the anchor clock frequency of the anchor A2-A4 from which the at least one anchor data packet was received. This step 340 may in particular utilize carrier frequency offset estimation based on carrier integration. The method further comprises a step 350 of estimating the clock frequency offset in the mobile device M based on the estimated mobile device clock frequency offset and the anchor clock frequency offset included in the at least one received anchor data packet. The step 350 may in particular involve calculating a sum of the estimated mobile device clock frequency offset and the anchor clock frequency offset included in the at least one received anchor data packet:

$$\epsilon_{M,ref} = \epsilon_{M,i} + \epsilon_{i,ref}$$

Here, $\epsilon_{M,i}$ denotes the estimated mobile device clock frequency offset relative to anchor i, while $\epsilon_{i,ref}$ denotes the anchor clock frequency offset included in the anchor data packet received from anchor i.

In many practical implementations, the mobile device M may receive anchor packets from a plurality of anchors A2-A4. It should be noted that any number of anchors may be used depending on the specific implementation and other circumstances. In these cases, the mobile device M may estimate its clock frequency offset in the manner described above based on each received anchor data packet and then perform statistical processing, such as averaging, to obtain one single estimate for the clock frequency offset relative to the controller clock frequency. For example, in a case where anchor data packets are received from a total of N anchors, the resulting estimate may be calculated by averaging the individual sums for all N anchors:

$$\epsilon_{M,ref} = \frac{\sum_{i=1}^{N}(\epsilon_{M,i} + \epsilon_{i,ref})}{N}$$

To illustrate this, a simple example is provided: Assume that a mobile node has a clock that runs at a frequency offset 5 ppm faster than the clock of the controller, while anchors A2 and A3 have +2 ppm and −3 ppm, respectively. In such case, the mobile node may estimate (based on CFO carrier integration) during packet receptions that the clocks of anchors A2 and A3 run at respectively 3 ppm and 8 ppm slower than its own clock. In this case, the above general formula yields:

$$\epsilon_{M,ref} = \frac{\sum_{i=1}^{N}(\epsilon_{M,i} + \epsilon_{i,ref})}{N} = \frac{(3ppm + 2ppm) + (8ppm + (-3ppm))}{2} = \frac{10}{2} = 5ppm$$

It should be noted that each CFO estimate may suffer from an error in the order of hundreds of ppb. However, by aggregating multiple estimates from different anchors, the final estimate can be significantly improved.

Figure 4:
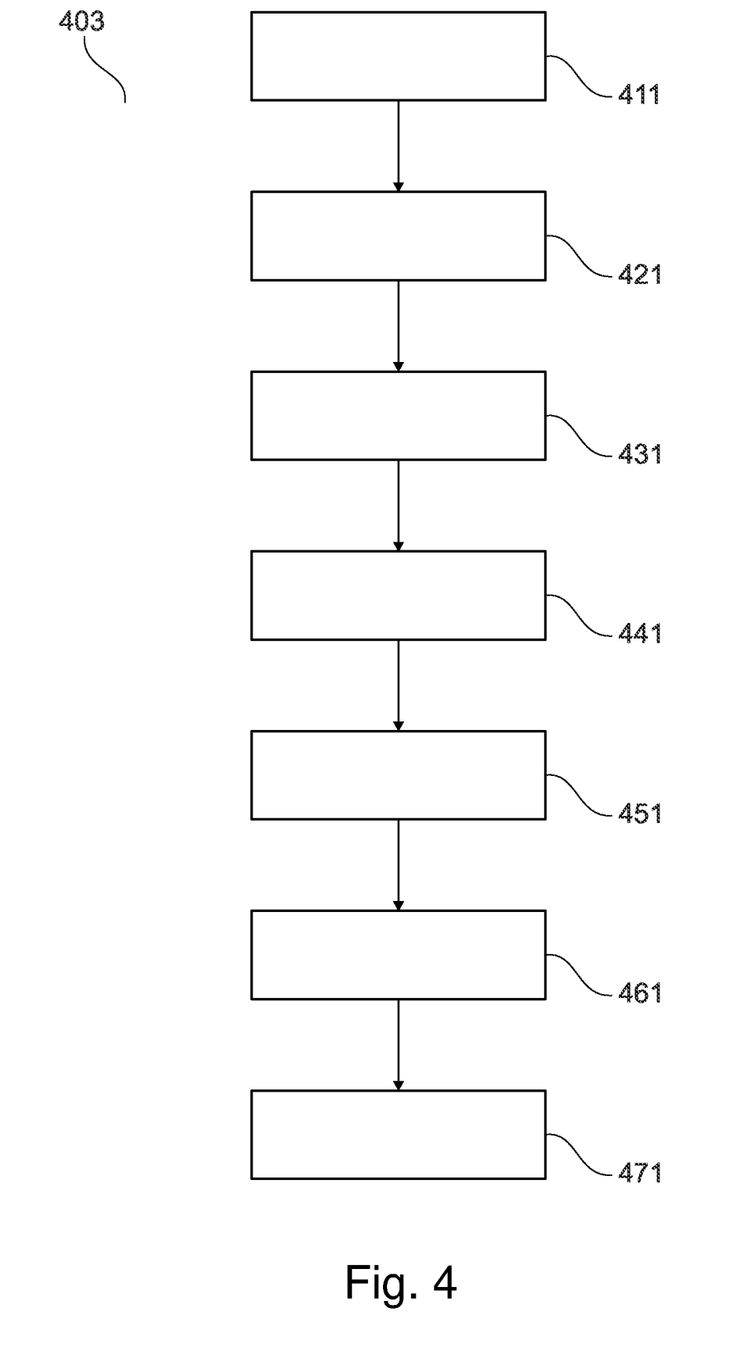
FIG. 4 shows a block diagram of a method of localizing a mobile device within a UWB network in accordance with an embodiment.

FIG. 4 shows a block diagram 403 of a method of localizing a mobile device M within a UWB 105 network in accordance with an embodiment. More specifically, FIG. 4 shows a TDoA-based method of localizing the mobile device M within UWB network 105, the UWB network 105 comprising a controller A1 and a plurality of anchors A2-A4 in communication with the controller A1 and the mobile device M, each anchor A2-A4 having a respective anchor clock and the controller A1 having a controller clock. The method 403 comprises a step 411 of determining, for each of the plurality of anchors A2-A4, an anchor clock frequency offset relative to the controller clock frequency. The method 403 further comprises a step 421 of broadcasting an anchor data packet from each anchor A2-A4, the anchor data packet including the respective anchor clock frequency offset and an anchor timestamp. The method 403 further comprises a step 431 of receiving a plurality of anchor data packets at the mobile device M, each anchor data packet originating from one of the plurality of anchors A2-A4. The method 403 further comprises a step 441 of recording, for each of the received anchor data packets, a corresponding timestamp of arrival. The method 403 further comprises a step 451 of estimating, for each of the received anchor data packets, a mobile device clock frequency offset relative to the anchor clock frequency of the anchor from which the anchor data packet was received. This step 451 may in particular utilize carrier frequency offset estimation based on carrier integration. The method 403 further comprises a step 461 of estimating a clock frequency offset in the mobile device M relative to the clock frequency of the controller A1 based on the estimated mobile device clock frequency offsets relative to the anchor clock frequencies and the anchor clock frequency offsets included in the received anchor data packets. The method 403 further comprises a step 471 of determining a location of the mobile device M based on the anchor timestamps in the received anchor data packets, the recorded timestamps of arrival for each of the received anchor data packets, and the estimated clock frequency offset in the mobile device M.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also, elements described in association with different embodiments may be combined. It should also be noted that reference signs in the claims should not be construed as limiting the scope of the claims.

The invention claimed is:

1. A method of estimating a clock frequency offset in a mobile device relative to a clock frequency of a controller within a UWB network, the UWB network comprising a plurality of anchors in communication with the controller and the mobile device, each anchor in the plurality of anchors having a respective anchor clock, the method comprising:
   determining, for each of the plurality of anchors, an anchor clock frequency offset relative to the controller clock frequency;
   broadcasting an anchor data packet from each anchor, the anchor data packet including the respective anchor clock frequency offset;
   receiving at least one anchor data packet at the mobile device;
   estimating a mobile device clock frequency offset relative to the anchor clock frequency of the anchor from which the at least one anchor data packet was received; and
   estimating the clock frequency offset in the mobile device based on the estimated mobile device clock frequency offset and the anchor clock frequency offset included in the at least one received anchor data packet.

2. The method according to claim 1, wherein estimating the mobile device clock frequency offset relative to the anchor clock frequency utilizes carrier frequency offset estimation based on carrier integration.

3. The method according to claim 1, wherein estimating the clock frequency offset in the mobile device comprises calculating a sum of the estimated mobile device clock frequency offset and the anchor clock frequency offset included in the at least one received anchor data packet.

4. The method according to claim 1, wherein determining the anchor clock frequency offset relative to the controller clock frequency comprises:
   receiving a first controller data packet at the anchor, the first controller data packet comprising a first controller timestamp indicating the time of transmission at the controller, and recording the time of receipt of the first controller data packet at the anchor as a first anchor timestamp;
   receiving a second controller data packet at the anchor, the second controller data packet comprising a second controller timestamp indicating the time of transmission at the controller, and recording the time of receipt of the second controller data packet at the anchor as a second anchor timestamp; and
   determining the anchor clock frequency offset by calculating a difference between the second controller timestamp and the first controller timestamp and dividing the calculated difference with a difference between the second anchor timestamp and the first anchor timestamp.

5. The method according to claim 1, further comprising:
   receiving a plurality of anchor data packets at the mobile device;
   estimating, for each of the received anchor data packets, a mobile device clock frequency offset relative to the anchor clock frequency of the anchor from which the anchor data packet was received; and
   estimating the clock frequency offset in the mobile device relative to the clock frequency of the controller based on the estimated mobile device clock frequency offsets relative to the anchor clock frequencies and the anchor clock frequency offsets relative to the controller clock frequency included in the received anchor data packets.

6. The method according to claim 5, wherein estimating the clock frequency offset in the mobile device comprises calculating, for each of the anchors from which the plurality of anchor data packets was received, a sum of the estimated mobile device clock frequency offset and the anchor clock frequency offset included in the anchor data packet received from the corresponding anchor.

7. The method according to claim 6, wherein estimating the clock frequency offset in the mobile device further comprises statistical processing of the calculated sums.

8. The method according to claim 7, wherein the statistical processing comprises calculating an average value of the calculated sums.

9. A TDoA-based method of localizing a mobile device within a UWB network, the UWB network comprising a controller and a plurality of anchors in communication with the controller and the mobile device, each anchor in the plurality of anchors having a respective anchor clock and the controller having a controller clock, the method comprising:
   determining, for each of the plurality of anchors, an anchor clock frequency offset relative to the controller clock frequency;

broadcasting an anchor data packet from each anchor, the anchor data packet including the respective anchor clock frequency offset and an anchor timestamp;

receiving a plurality of anchor data packets at the mobile device, each anchor data packet originating from one of the plurality of anchors;

recording, for each of the received anchor data packets, a corresponding timestamp of arrival;

estimating, for each of the received anchor data packets, a mobile device clock frequency offset relative to the anchor clock frequency of the anchor from which the anchor data packet was received;

estimating a clock frequency offset in the mobile device relative to the clock frequency of the controller based on the estimated mobile device clock frequency offsets relative to the anchor clock frequencies and the anchor clock frequency offsets included in the received anchor data packets; and determining a location of the mobile device based on the anchor timestamps in the received anchor data packets, the recorded timestamps of arrival for each of the received anchor data packets, and the estimated clock frequency offset in the mobile device.

10. The method according to claim 9, wherein estimating the mobile device clock frequency offset relative to the anchor clock frequency utilizes carrier frequency offset estimation based on carrier integration.

11. The method according to claim 9, wherein determining, for each of the plurality of anchors, the anchor clock frequency offset relative to the controller clock frequency comprises:

receiving a first controller data packet at the anchor, the first controller data packet comprising a first controller timestamp indicating the time of transmission at the controller, and recording the time of receipt of the first controller data packet at the anchor as a first anchor timestamp;

receiving a second controller data packet at the anchor, the second controller data packet comprising a second controller timestamp indicating the time of transmission at the controller, and recording the time of receipt of the second controller data packet at the anchor as a second anchor timestamp; and determining the anchor clock frequency offset by calculating a difference between the second controller timestamp and the first controller timestamp and dividing the calculated difference with a difference between the second anchor timestamp and the first anchor timestamp.

12. The method according to claim 9, wherein estimating the clock frequency offset in the mobile device comprises calculating, for each of the anchors from which the plurality of anchor data packets was received, a sum of the estimated mobile device clock frequency offset and the anchor clock frequency offset included in the anchor data packet received from the corresponding anchor.

13. The method according to claim 12, wherein estimating the clock frequency offset in the mobile device further comprises statistical processing of the calculated sums.

14. The method according to claim 13, wherein the statistical processing comprises calculating an average value of the calculated sums.

15. A TDoA-based localization system, the system comprising:

at least one UWB enabled mobile device having a mobile device clock; and a UWB network, the UWB network comprising a controller and a plurality of anchors, each anchor in the plurality of anchors having a respective anchor clock and the controller having a controller clock, wherein each of the anchors is configured to:
determine an anchor clock frequency offset relative to the controller clock frequency; and
broadcast an anchor data packet, the anchor data packet including the respective anchor clock frequency offset and an anchor timestamp;

wherein the at least one mobile device is configured to:
receive a plurality of anchor data packets, each anchor data packet originating from one of the plurality of anchors;
record, for each of the received anchor data packets, a corresponding timestamp of arrival;
estimate, for each of the received anchor data packets, a mobile device clock frequency offset relative to the anchor clock frequency of the anchor from which the anchor data packet was received;
estimate a clock frequency offset in the mobile device relative to the clock frequency of the controller based on the estimated mobile device clock frequency offsets relative to the anchor clock frequencies and the anchor clock frequency offsets included in the received anchor data packets; and
determine a location of the mobile device based on the anchor timestamps in the received anchor data packets, the recorded timestamps of arrival for each of the received anchor data packets, and the estimated clock frequency offset in the mobile device.

16. The system according to claim 15, wherein the at least one mobile device is configured to estimate the mobile device clock frequency offset relative to the anchor clock frequency by utilizing carrier frequency offset estimation based on carrier integration.

17. The system according to claim 15, wherein each of the anchors is configured to determine the anchor clock frequency offset relative to the controller clock frequency by:

receiving a first controller data packet at the anchor, the first controller data packet comprising a first controller timestamp indicating the time of transmission at the controller, and recording the time of receipt of the first controller data packet at the anchor as a first anchor timestamp;

receiving a second controller data packet at the anchor, the second controller data packet comprising a second controller timestamp indicating the time of transmission at the controller, and recording the time of receipt of the second controller data packet at the anchor as a second anchor timestamp; and determining the anchor clock frequency offset by calculating a difference between the second controller timestamp and the first controller timestamp and dividing the calculated difference with a difference between the second anchor timestamp and the first anchor timestamp.

18. The system according to claim 15, wherein the at least one mobile device is configured to estimate the clock frequency offset in the mobile device by calculating, for each of the anchors from which the plurality of anchor data packets was received, a sum of the estimated mobile device clock frequency offset and the anchor clock frequency offset included in the anchor data packet received from the corresponding anchor.

19. The system according to claim 18, wherein the at least one mobile device is further configured to estimate the clock frequency offset in the mobile device by performing statistical processing of the calculated sums.

20. The method according to claim 19, wherein the statistical processing comprises calculating an average value of the calculated sums.

* * * * *